Feb. 17, 1970 V. B. CETRONE 3,495,849
SEAT BELT AND ATTACHMENT MEANS
Filed Nov. 21, 1967 2 Sheets-Sheet 1

INVENTOR.
VINCENT B. CETRONE
BY *W. B. Harpman*
ATTORNEY

INVENTOR.
VINCENT B. CETRONE
BY
ATTORNEY

United States Patent Office 3,495,849
Patented Feb. 17, 1970

3,495,849
SEAT BELT AND ATTACHMENT MEANS
Vincent B. Cetrone, 8569 Sleepy Hollow Drive,
Warren, Ohio 44484
Filed Nov. 21, 1967, Ser. No. 684,866
Int. Cl. B60p 21/00
U.S. Cl. 280—150
9 Claims

ABSTRACT OF THE DISCLOSURE

A seat belt for a vehicle driver having means engageable with a latched receptacle formed in the seat back of the vehicle and means on said belt for remotely controlling said latched receptacle.

---

This invention relates to a seat belt and more particularly to a seat belt that may be positioned on a vehicle driver and which will automatically engage and couple to a latching receptacle formed in the back of the driver's seat in said vehicle.

The principal object of the invention is the provision of a seat belt for a vehicle driver having means detachably engaging a fitting formed in the back of the driver's seat in a vehicle so as to enable the driver to be automatically secured thereto, upon leaning thereagainst.

A further object of the invention is the provision of a a seat belt that may be continuously worn by a driver who is moving into and out of a vehicle such as a delivery truck or the like, and arranged so that when he takes his position on the driver's seat he will automatically be coupled to the seat back and held until he releases the holding mechanism.

A still further object of the invention is the provision of a seat belt for a vehicle driver of a delivery truck or the like, that may be conveniently and easily worn by the driver at all times, and provided with means at the back of the belt for engaging coupling means formed in the seat back of the vehicle.

The seat belt and seat and back structure for cooperative engagement with the seat belt as disclosed herein, is particularly adapted for drivers of delivery trucks, mail trucks and the like, where the driver is constantly leaving the vehicle and then returning thereto. Conventional seat belts are time consuming and sufficiently difficult in attaching and releasing to preclude the possibility of many truck drivers using the same. The present invention provides the driver with a lightweight, comfortable seat belt which may or may not include shoulder straps for holding it in a desired position, with means on the back thereof for automatically engaging and being held by a latching mechanism formed in a recess in the back of the driver's seat. Means on the belt enables the driver to conveniently and easily unlatch it when he leaves the truck, and when he returns to the truck he merely sits on the driver's seat, leans against the back and is automatically secured by the engagement of the seat belt and the coupling means.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein.

Figure 1:
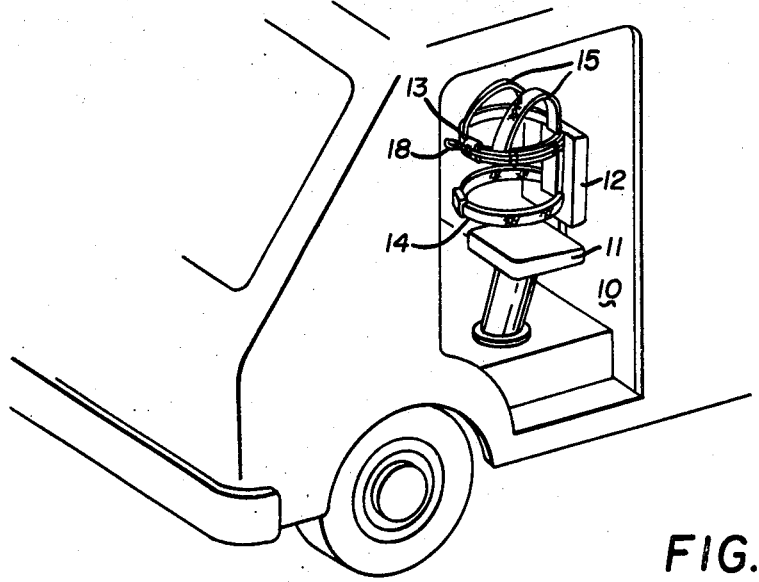
FIGURE 1 is a perspective view of a portion of a delivery truck showing a driver's seat and back, with the seat belt shown in operative position therein.
Figure 2:
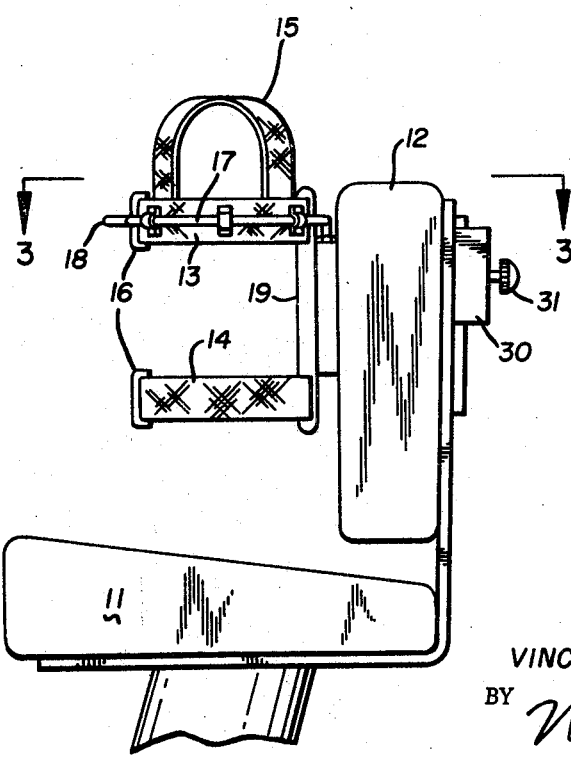
FIGURE 2 is an enlarged side elevation of a portion of the driver's seat and the seat belt seen in FIGURE 1 of the drawings.

By referring to the drawings, and FIGURE 1 in particular, it will be seen that a delivery truck is partially illustrated and includes a driver's compartment 10 having a seat 11 with an adjustable back 12 mounted thereon, as is customary in delivery trucks and the like. The seat back 12 is formed with a pair of horizontally spaced back cushions, as may be seen in the top plan view of FIGURE 3 of the drawings, with the space therebetween providing means for locating a coupling mechanism.

Figure 3:
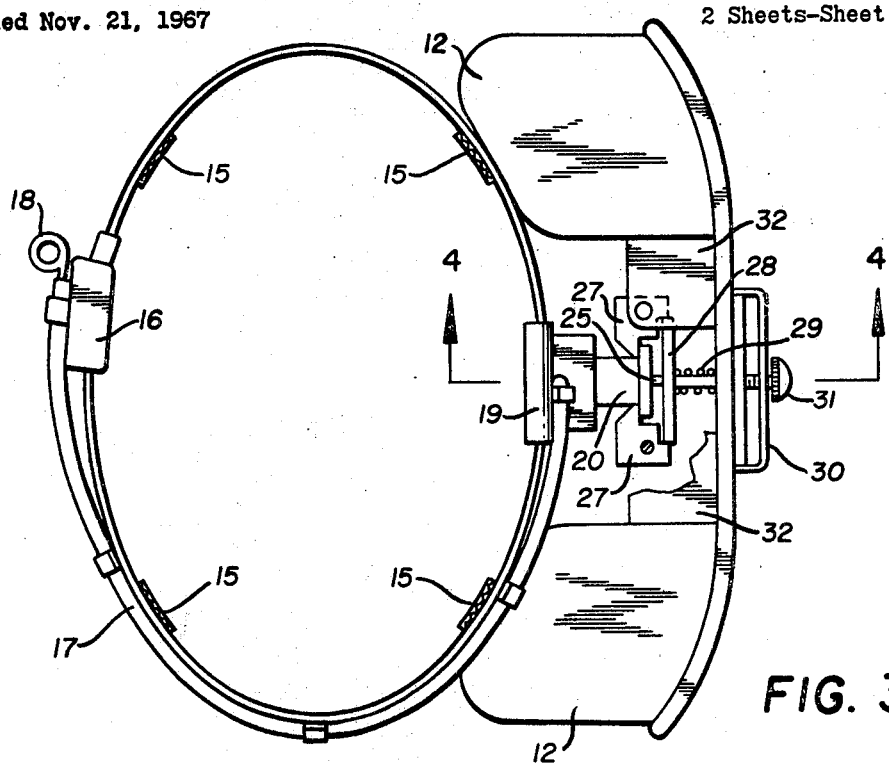
FIGURE 3 is a horizontal section on line 3—3 of FIGURE 1 on an enlarged scale.

Still referring to FIGURE 1 of the drawings, it will be seen that a seat belt is shown in position where it would be worn by a driver of the vehicle and attached to the coupling mechanism in the seat back 12. The seat belt includes a main belt 13, and a secondary belt 14 which is optional. Additionally, shoulder straps 15 are illustrated and again they are optionally provided. The main belt 13 and the secondary belt 14 are provided with buckles 16 so that the belts may be positioned about the body of a driver of the vehicle and secured thereto, as customary. The belt 13 is also provided with a release mechanism including a flexible cable in a conduit 17 and an operating handle 18 located at the front of the belt in proximity to the buckle 16. The belts 13 and 14 are connected by a vertical member 19 at their back portions, and this vertical member 19 mounts a rearwardly extending headed fastening member 20, as best seen in FIGURE 3 of the drawings. The member 19 also includes movable means for actuating the coupling mechanism which receives and holds the headed fastening member 20, as hereinafter described.

Figure 4:
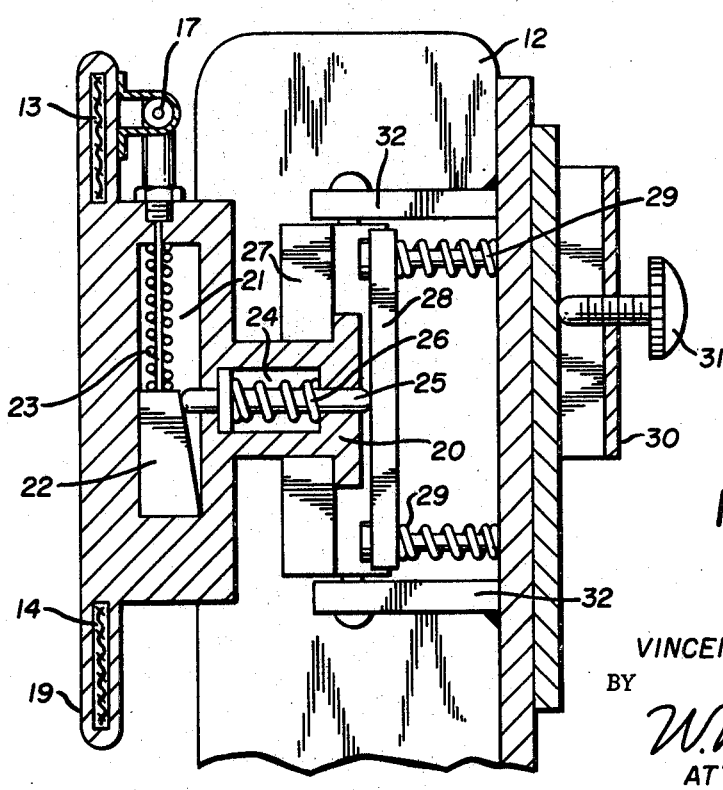
FIGURE 4 is a horizontal section on line 4—4 of FIGURE 3 on an enlarged scale.

By referring now to FIGURES 3 and 4 of the drawings, it will be seen that the vertical member 19 includes a cavity 21 in which a tapered block 22 is slidably positioned. The tapered block 22 is secured to one end of the flexible cable 17, and a spring 23 is positioned between the tapered block 22 and the upper end of the cavity 21, and normally biases the tapered block in one direction. A secondary cavity 24 is formed in the headed fastening member 20, and mounts a horizontally positioned pin 25 and a biasing spring 26 which normally urges the pin 25 inwardly of the headed fastening member 20 and against the tapered block 22. It will thus be seen that when the handle or eyelet 18 on the opposite end of the flexible cable 17 located at the front of the seat belt 13 is moved, the resultant action moves the tapered block 22 against the pin 25 and causes the pin 25 to move outwardly of the headed fastening member 20. This motion is used to unlatch the coupling construction which has engaged and held the headed fastening member 20, as hereinafter described.

Still referring to FIGURES 3 and 4 of the drawings, it will be seen that the coupling mechanism built into the seat back 12 comprises a pair of horizontally spaced vertically extending pivoted jaw members 27, which are positioned in oppositely disposed relation with their pivot means extending vertically into brackets 32 positioned above and below the same, and off-center with respect to the headed fastening member 20 which is adapted to engage the pivoted jaw members 27 and move therebetween so as to be held thereby, as best illustrated in FIGURE 3 of the drawings. The pivoted jaw members 27 are pivotally arranged so that they will move when the headed fastening member 20 engages them and pushes therebetween. As seen in FIGURE 3 of the drawings, the pivoted jaw member 27 on the upper side of the headed fastening member 20 will move counter-clockwise when this occurs, and the pivoted jaw 27 below the headed fastening member 20 will move clockwise. The movement is controlled by a pressure plate 28 which is biased toward the pivoted jaw members 27 by a tension spring 29, and the pivoted jaw members 27 have vertically extending formations which are engaged by the pressure plate 28 so as to prevent the pivoted jaw members 27 from moving in opposite motion to that hereinbefore described. At such time as it is desired to release the headed fastening member 20 from its locked positioning in the coupling mechanism, the actuation of the flexible cable 17 by the handle 18 will more the pin 25 outwardly of the headed fastening member 20, that is, to the right as seen in FIGURES 3 and 4 of the drawings, where it will engage the pressure plate 28 and move it momentarily out of engagement with the vertical configurations of the pivoted jaw members 27. This will permit them to rotate in the opposite direction so as to free the headed fastening member which may then move outwardly therefrom to the left, as seen in FIGURES 3 and 4 of the drawings.

It will thus be seen that a driver of a delivery truck or postal vehicle or the like, who is constantly in and out of the truck during his working hours, can wear the seat belt arrangement disclosed herein and each and every time he takes his position on the driver's seat of the vehicle he will automatically be coupled to the seat back and he can just as readily release the coupling by moving the handle or eyelet 18 on the front of the belt when he wishes to leave the truck. Thus, the driver is provided with the safety of a seat belt at all times and with a minimum of effort in using the same.

Those skilled in the art will observe that the different sizes and shapes of the physiques of the individual drivers will require adjustment of the matching parts, and this is provided for in the present disclosure by arranging the coupling means including the vertically extending pivoted jaw members 27 of a height sufficient to receive the headed fastening member 20 at several alternate vertical locations. Alternatively, the entire seat back 12 may be adjusted vertically by a convenient friction adjusting clamp 30 with a hand operated pressure wheel 31 in a manner comparable to that used in office furniture.

Still another possibility of adjustment exists in the positioning of the belt on the driver by altering the length of the shoulder straps 15. It will thus be seen that a seat belt construction has been disclosed in combination with a coupling means built into a seat back of a driver's seat for a vehicle that will automatically couple the driver to the seat whenever he sits in the driver's position and permits him to free himself by a simple, easy actuation of a release handle conveniently located on the front of the belt.

Having thus described my invention, what I claim is:

1. A belt to be worn by a vehicle driver and means for securing said belt to said vehicle to retain said driver in said vehicle, said means including a fastening member on said belt at the back of said driver and extending rearwardly therefrom, and a coupling device on said vehicle at the back of said driver for detachably receiving and holding said fastening member, said coupling device including at least one yieldably mounted latching member having a substantially greater extent in one direction than said fastening member thereby presenting a relatively large area engageable by said fastening member to receive the fastening member at several alternate locations along the extent of said latching member, said fastening member including cam means engaging said latching member to move said latching member to a first position to enable said fastening member to pass behind said latching member, said latching member movable to a second position upon reverse movement of said fastening member to lock said fastening member to said coupling device, and means for actuating said coupling device to effect uncoupling of said fastening member.

2. The belt and coupling device set forth in claim 1 and wherein a release mechanism is included in said coupling and means is provided for actuating said release mechanism remotely therefrom.

3. The belt and coupling device therefor set forth in claim 1 and wherein said vehicle has a seat and seat back construction therein, and said coupling device is located in said seat and back construction.

4. The belt and coupling device set forth in claim 2 and wherein said means for actuating said release mechanism is positioned on said belt and comprises a flexible cable extending from the front of said belt to said release mechanism.

5. The belt and coupling device as set forth in claim 1 wherein said coupling device includes a pair of horizontally spaced vertically extending pivoted jaw members and said fastening member is elongated and has an enlarged head on its end, said enlarged head cooperating with said jaw members to pivot them apart in a first direction and pass therebetween and said pivoted jaw members movable in a second direction into operative relationship behind said enlarged head to lock said fastening member to said coupling device upon reverse movement of said fastening member.

6. The belt and coupling device as set forth in claim 5 wherein locking means is biased into operative relationship with said pivoted jaw members to lock them against movement in said second direction beyond a predetermined point.

7. The belt and coupling device set forth in claim 6 wherein said means for actuating said coupling device includes release mechanism engageable with said locking means to move said locking means against said bias into inoperative position to permit said pivoted jaw members to move in said second direction to release said fastening member from said coupling device.

8. A belt to be worn by a vehicle driver and means for securing said belt to said vehicle, said means including an elongate fastening member having an enlarged head at one end, said fastening member carried by and extending rearwardly from said belt at the back of the driver;

a coupling device on said vehicle at the back of said driver for detachably receiving and holding said fastening member, said coupling device comprising a pair of horizontally spaced vertically extending pivoted jaw members, each of said jaw members having first shoulder means at one side of their respective axes;

a locking plate biased forwardly into contact with said shoulder means between said jaw members to prevent the jaw members from pivoting forwardly, said jaw members engaging and pushing said locking plate rearwardly out of operative engagement with said shoulder means when said jaw members are pivoted rearwardly upon engagement by said fastening member, said jaw members having second shoulder means at the other side of their respective axes, said enlarged head on said fastening member engaging said second shoulder means upon forward movement of said fastening member to lock said fastening member to said coupling device;

and means carried by said belt and said fastening member for moving said locking plate rearwardly out of operative engagement with said first shoulder means to permit forward pivoting of said jaw members and withdrawal of said fastening member from said coupling device.

9. The belt and coupling device set forth in claim 8 wherein said pivoted jaw members have a vertical dimension substantially greater than that of said fastening member whereby said fastening member may be locked to said coupling device at several alternate vertical locations.

References Cited

UNITED STATES PATENTS

| 2,822,034 | 11/1955 | Dixon | 297—384 |
|---|---|---|---|
| 3,278,230 | 10/1966 | Boyce et al. | 297—384 |
| 3,302,633 | 2/1967 | Vykukal | 128—1 |
| 3,330,599 | 7/1967 | Inoue | 297—388 |

FOREIGN PATENTS 134,625  10/1919  Great Britain.

LEO FRIAGLIA, Primary Examiner

ROBERT R. SONG, Assistant Examiner